(12) United States Patent
Johnson

(10) Patent No.: US 7,487,977 B2
(45) Date of Patent: Feb. 10, 2009

(54) MULTIPLE CONFIGURATION CHILDREN'S WAGON

(75) Inventor: Mark Johnson, Cary, IL (US)

(73) Assignee: Radio Flyer Inc., Chicago, IL (US)

( * ) Notice: Subject to any disclaimer, the term of this patent is extended or adjusted under 35 U.S.C. 154(b) by 194 days.

(21) Appl. No.: 11/604,547

(22) Filed: Nov. 27, 2006

(65) Prior Publication Data

US 2008/0122191 A1    May 29, 2008

Related U.S. Application Data

(60) Provisional application No. 60/848,433, filed on Sep. 30, 2006.

(51) Int. Cl.
*B62B 9/00* (2006.01)

(52) U.S. Cl. .............. 280/47.34; 280/47.4; 280/647; 280/87.01; 280/47.38

(58) Field of Classification Search .............. 280/47.34, 280/47.4, 647, 87.01, 47.38
See application file for complete search history.

(56) References Cited

U.S. PATENT DOCUMENTS

| | | | | |
|---|---|---|---|---|
| 2,532,004 | A * | 11/1950 | Zepp | 280/7.1 |
| 4,735,426 | A * | 4/1988 | McConnell | 280/87.01 |
| 6,318,740 | B1 * | 11/2001 | Nappo | 280/87.01 |
| 6,497,424 | B2 * | 12/2002 | Gartner et al. | 280/47.4 |
| 6,641,149 | B2 * | 11/2003 | Chiappetta et al. | 280/87.01 |
| 6,932,365 | B2 | 8/2005 | Chiappetta et al. | |
| 2004/0232639 | A1 * | 11/2004 | Chiappetta et al. | 280/47.34 |

\* cited by examiner

*Primary Examiner*—Christopher Ellis
*Assistant Examiner*—Cynthia F. Collado
(74) *Attorney, Agent, or Firm*—DLA Piper LLP; R. Blake Johnston

(57) ABSTRACT

A children's wagon includes a body supported by wheels and having an interior. Panels are pivotally attached to the wagon body and are positioned within the interior of the wagon. At least one such panel has a second panel pivotally attached to it. The panels may be moved between generally upright and horizontal positions so that the wagon features multiple interior configurations.

20 Claims, 17 Drawing Sheets

MULTIPLE CONFIGURATION CHILDREN'S WAGON

CLAIM OF PRIORITY

This application claims priority to provisional U.S. Patent Application No. 60/848,433, filed Sep. 30, 2006, currently pending.

BACKGROUND

The field of the invention relates generally to children's wagons, and, more particularly, to a children's wagon having hinged interior panels that provide multiple seating and storage configurations in the wagon.

A standard children's wagon generally consists of a wagon body having a horizontally disposed surface or floor for supporting a child and upstanding front, rear and side walls formed around the periphery of this surface. Four wheels are attached to the bottom of the body and a handle is typically attached to either the front of the wagon body or to a pivoting bolster to which the front wheels of the wagon are attached.

In the past, wagon bodies and handles have been formed of wood, metal or combinations thereof. Recently, however, wagon bodies and handles have been made from molded plastic, such as polyethylene or some similar material. Such wagons are becoming increasingly popular because of their light weight, durability, corrosion resistance, lower manufacturing cost and safety.

Constructing wagon bodies from molded plastic also provides for greater flexibility in terms of product design. For example, additional storage spaces, seating and other interior features may be molded into the wagon body. An example of such a wagon is presented in U.S. Pat. No. 6,318,740 to Nappo and commonly owned U.S. Pat. No. 6,932,365 to Chiappetta et al.

The Nappo '740 patent illustrates a plastic wagon with a storage space molded into the bottom of its body with a removable panel that separates the storage space from the passenger space of the wagon. Coolers are also formed on the front and rear ends of the wagon. When the panel is removed, the storage space serves as a foot well for a pair of passengers facing one another with the coolers serving as back rests. The passengers sit on the portions of the passenger space floor that remain after the panel is removed. A disadvantage of the wagon of the Nappo '740 patent is that the removable panel, when not in use, must be stored. In additional to taking up storage space, it may become lost. Furthermore, the wagon of the Nappo '740 patent only features two interior configurations.

The Chiappetta et al. '365 patent illustrates a wagon having a storage space molded in the bottom of the plastic body. A pair of panels are attached within the interior of the wagon in a hinged fashion. When the panels are opened into generally vertical orientations, they form seatbacks for a pair of opposing seats so that children may sit in the wagon facing one another. The exposed storage space serves as a foot well for the wagon passengers. When the panels are closed into generally horizontal orientations, they cover the storage space so as to provide the interior of the wagon with a flat floor.

While the wagon of the Chiappetta et al. '365 wagon is versatile and does not feature panels that may become separated from the wagon and lost, additional interior configurations are still desirable. A children's wagon that offers multiple seating and storage configurations would provide increased convenience and utility.

SUMMARY

In one embodiment, the wagon of the present invention includes a body supported by a plurality of wheels with a handle mounted to the body. The body includes a front wall, a rear wall, opposing side walls and a bottom so that an interior is defined. A first panel is pivotally attached to the wagon body and positioned within the interior of the wagon body. A second panel is pivotally attached to the first panel so that the first and second panels may be placed in a variety of positions to provide the wagon with multiple interior configurations. A third panel is also pivotally attached to the wagon body and positioned within the interior of the wagon body and contributes to the multiple interior configurations.

DESCRIPTION OF THE EMBODIMENTS

Figure 1:
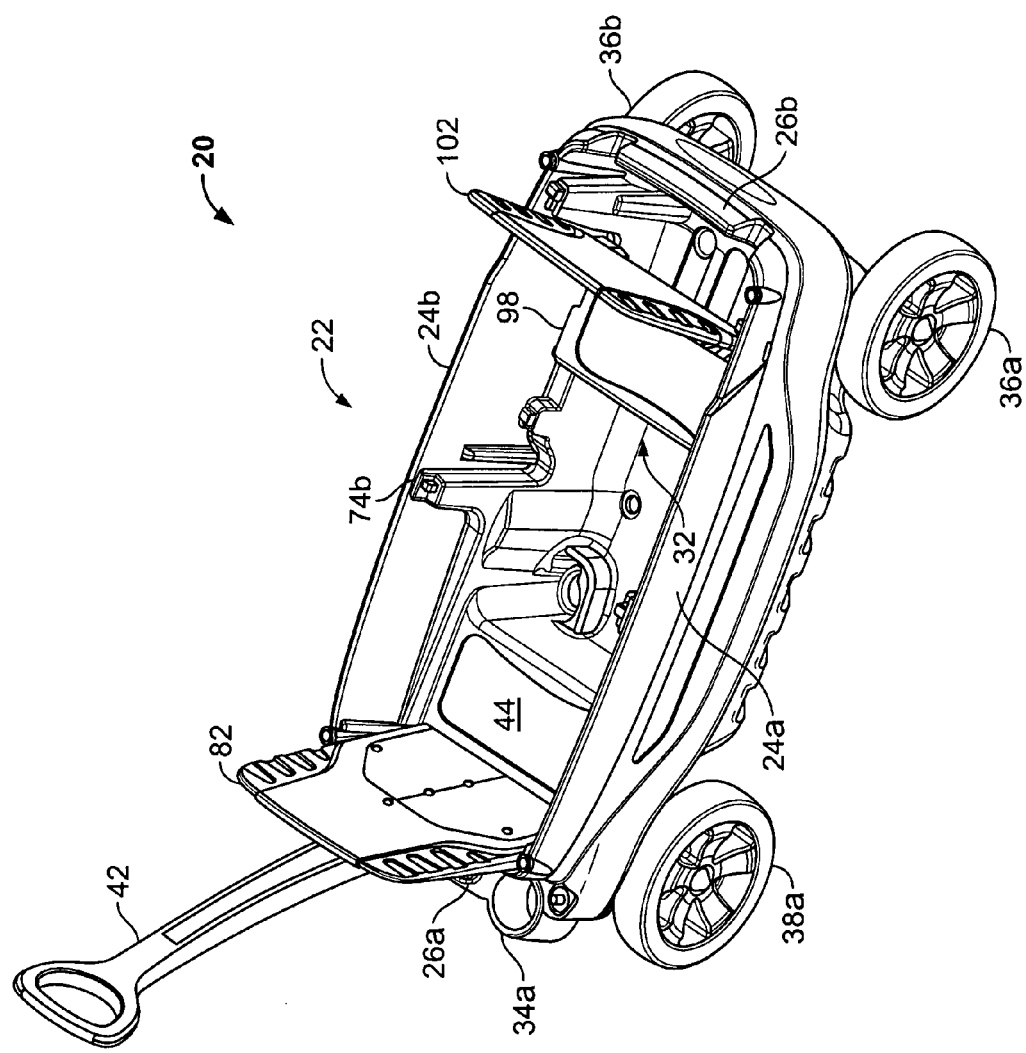
FIG. 1 is a perspective view of an embodiment of the wagon of the present invention in a first configuration.

An embodiment of the wagon of the present invention in a first configuration is indicated in general at 20 in FIG. 1. The wagon features a body, indicated in general at 22, that is preferably molded from linear low-density polyethylene plastic so as to be inexpensive to manufacture and smoothly safe for a child. The wagon body features an opposing pair of side walls 24a and 24b as well as an opposing pair of front and rear walls 26a and 26b. The front, rear and side walls form the periphery of the wagon body so that an interior, indicated in general at 32 in FIG. 1, is defined therein. A pair of parent cup holders 34a and 34b (FIG. 17) may optionally be molded into front wall 26a.

A pair of rear wheels 36a and 36b are attached to one another and the bottom of the back portion of the wagon body by a steel axle (not shown). A front pair of wheels 38a and 38b (38b not visible in FIG. 1) are attached to the front portion of the wagon body. The front wheels may be attached to the wagon body by generally hook-shaped rod members that swivel so that a caster arrangement is formed. Alternatively, the front wheels may be mounted on a bolster that is pivotally connected to the front portion of the wagon. Still other arrangements known in the art for attaching front wheels to a wagon body so that they may be turned may be employed.

Figure 17:
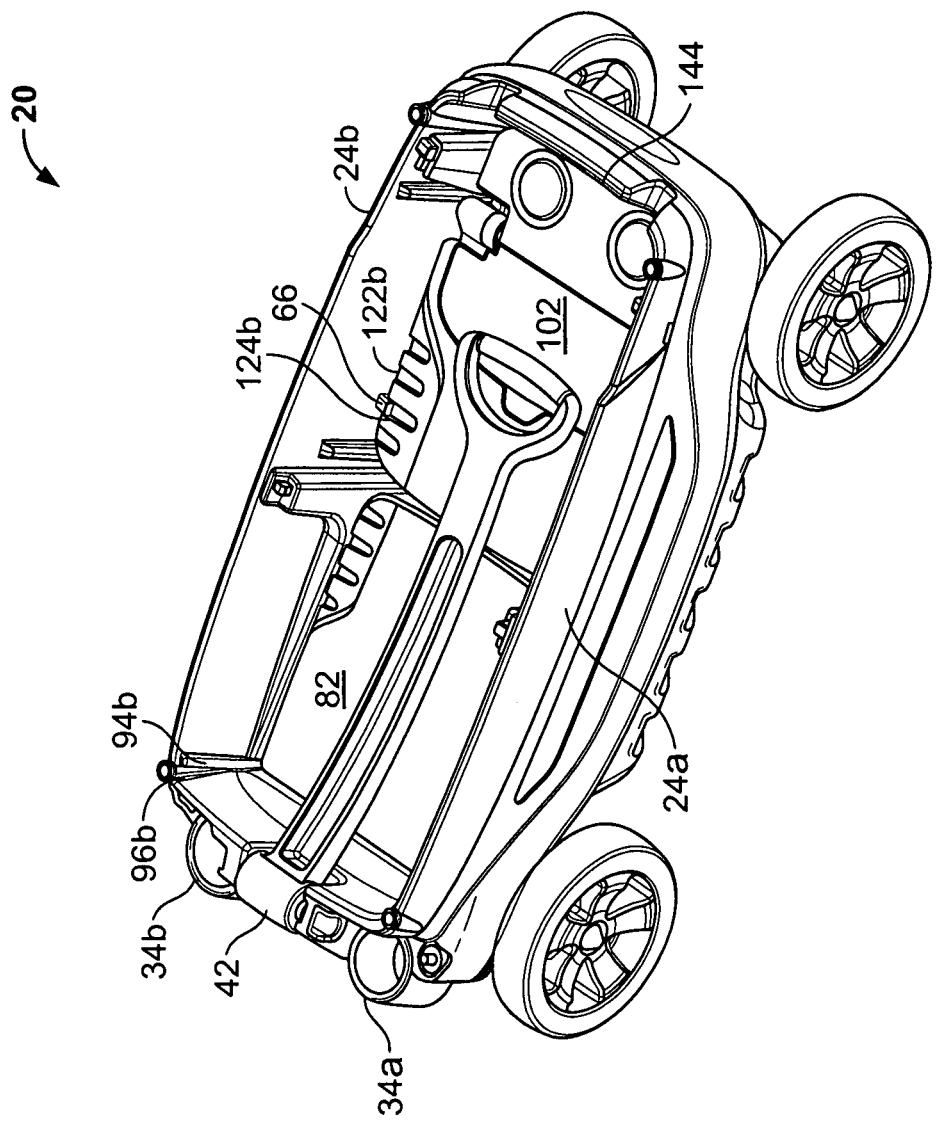
FIG. 17 is a perspective view of the wagon of FIG. 1 in a fifth configuration.

A handle 42, preferably also molded from linear low-density polyethylene plastic, is pivotally attached to the front wall 26a of the wagon body by a handle bracket 36 (FIG. 5), which is molded into or onto the front wall 26a of the wagon body. As illustrated in FIG. 17, the handle 42 may be pivoted so that it rests in the interior of the wagon for ease of storage and transport.

Figure 2:
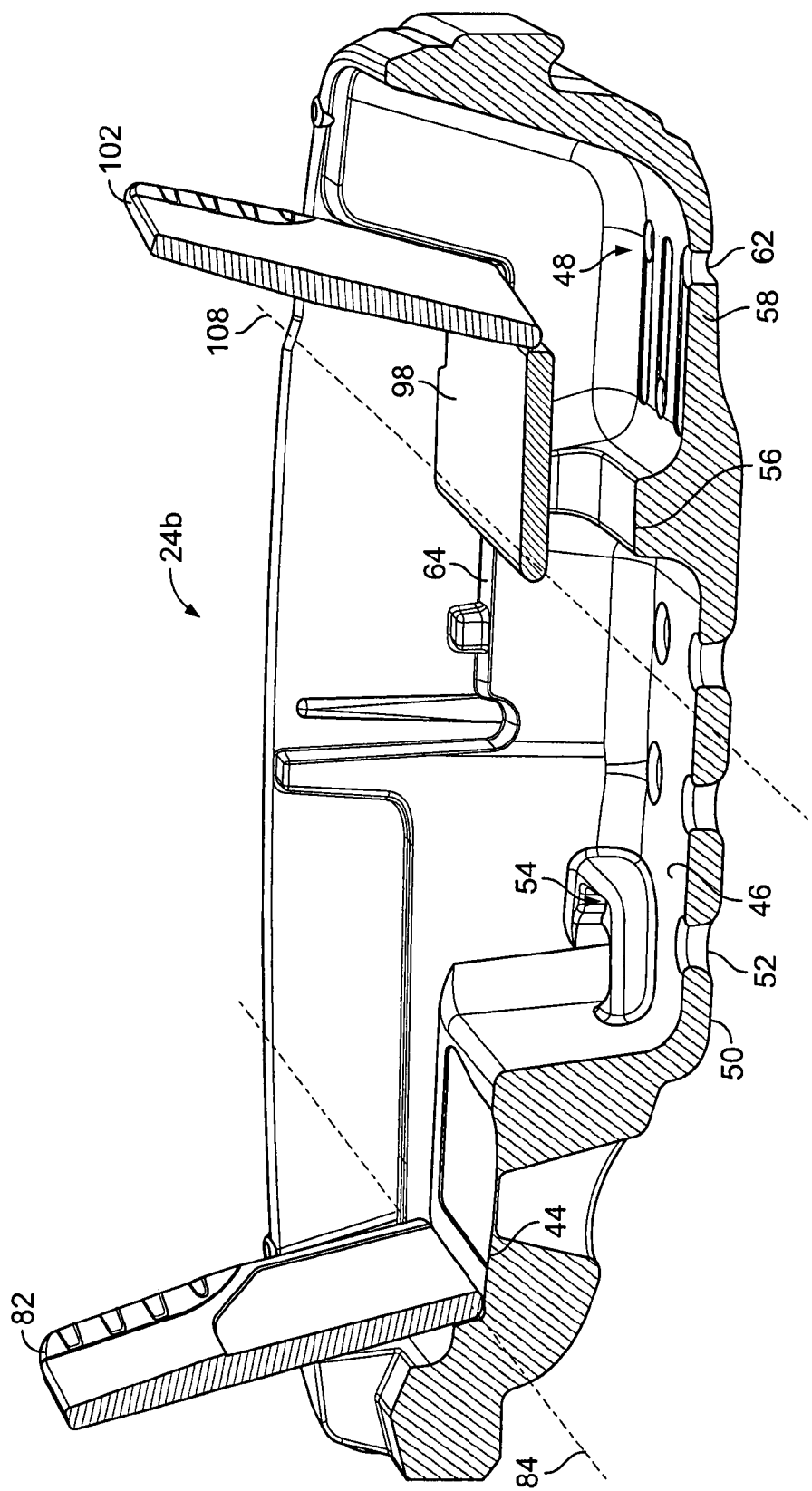
FIG. 2 is a sectional view of the body and interior panels of the wagon of FIG. 1.

As illustrated in FIG. 2, the floor of the wagon body is molded so as to include a seat bottom 44, a middle compartment 46 and a rear compartment 48. The bottom 50 of the middle compartment may also optionally be molded to include drain holes 52 and a cup holder 54. A divider 56 separates the middle compartment 46 from the rear compartment 48, which features bottom 58 and optional drain holes 62.

Figure 3:
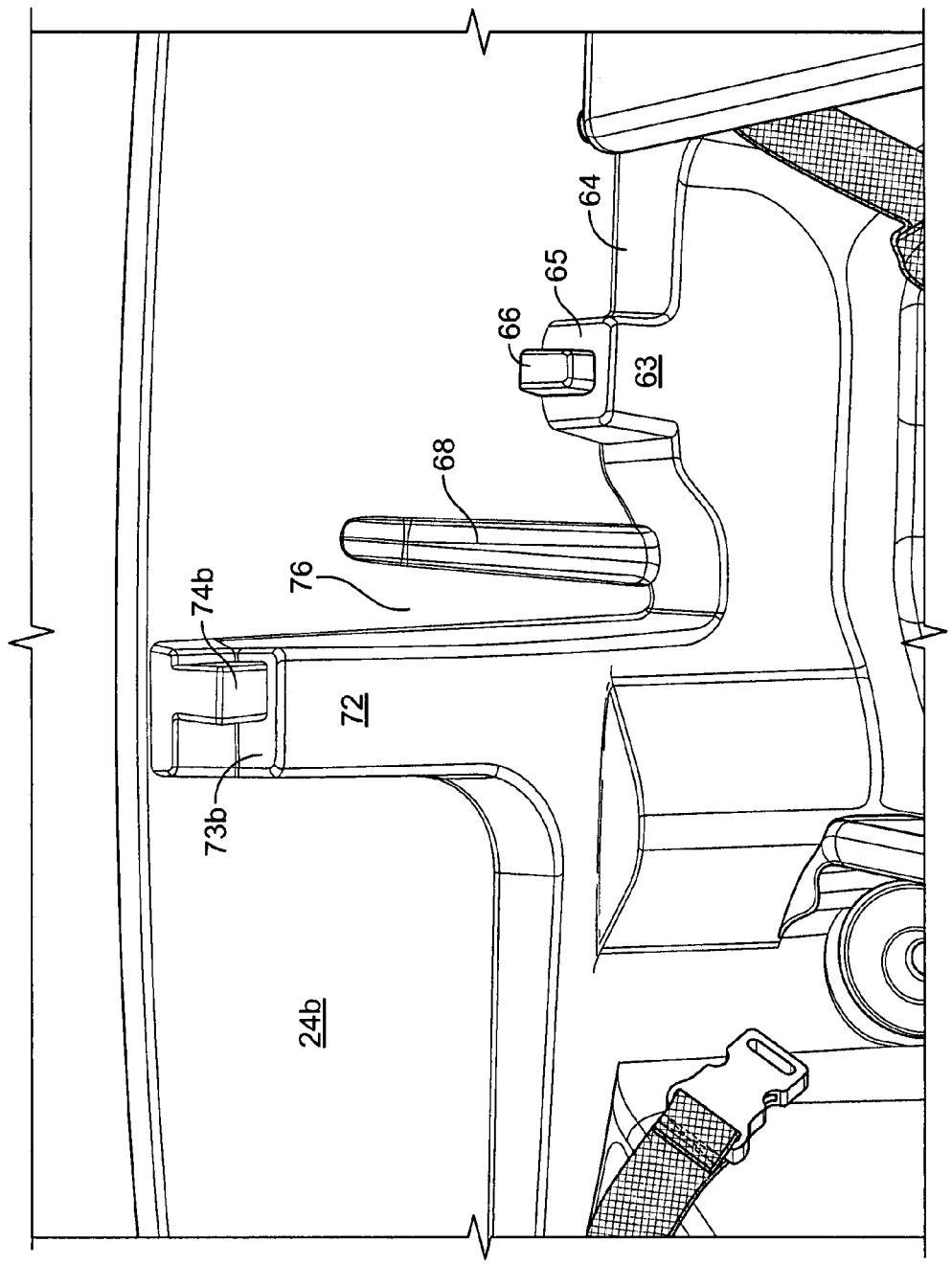
FIG. 3 is an enlarged perspective view of the interior surface of the middle portion of a side wall of the wagon.

As shown in FIG. 3, side wall 24b features ledge 64 which has a base projection 63 featuring a horizontal flat top portion 65 and a step portion 66. Ledge 64 terminates at one end against an inverted-spike shaped projection 68. A tower-shaped projection 72 featuring a top end having a flat horizontal portion 73b and a step portion 74b is spaced from the projection 68 so that vertical slot 76 is formed. Side wall 24a features a mirror image of this arrangement, the functionality of which will be explained below.

Figure 4:
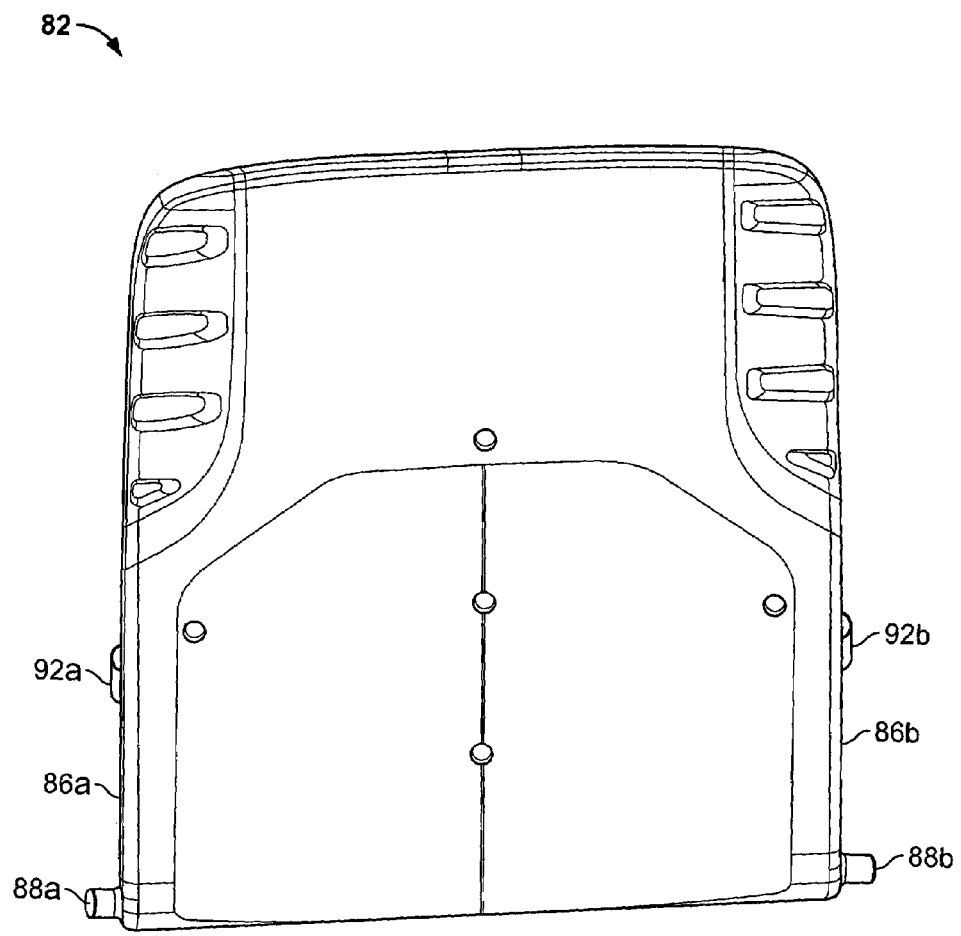
FIG. 4 is an enlarged perspective view of the front panel of the wagon of FIG. 1.

A front panel, illustrated at 82 in FIGS. 1 and 2 in the upright position is mounted adjacent to seat bottom 44 in a hinged fashion so as to pivot about axis 84 (illustrated in FIG. 2). More specifically, as illustrated in FIG. 4, where the front panel is indicated in general at 82, the side edges 86a and 86b of the front panel are provided with pins 88a and 88b, respectively. Pins 88a and 88b engage opposing bores formed in the side walls 24a and 24b (FIGS. 1 and 2) along axis 84 (FIG. 2). Pill-shaped bosses, indicated at 92a and 92b in FIG. 3, are also positioned on opposing side edges 86a and 86b, respectively, of front panel 82.

Figure 5:
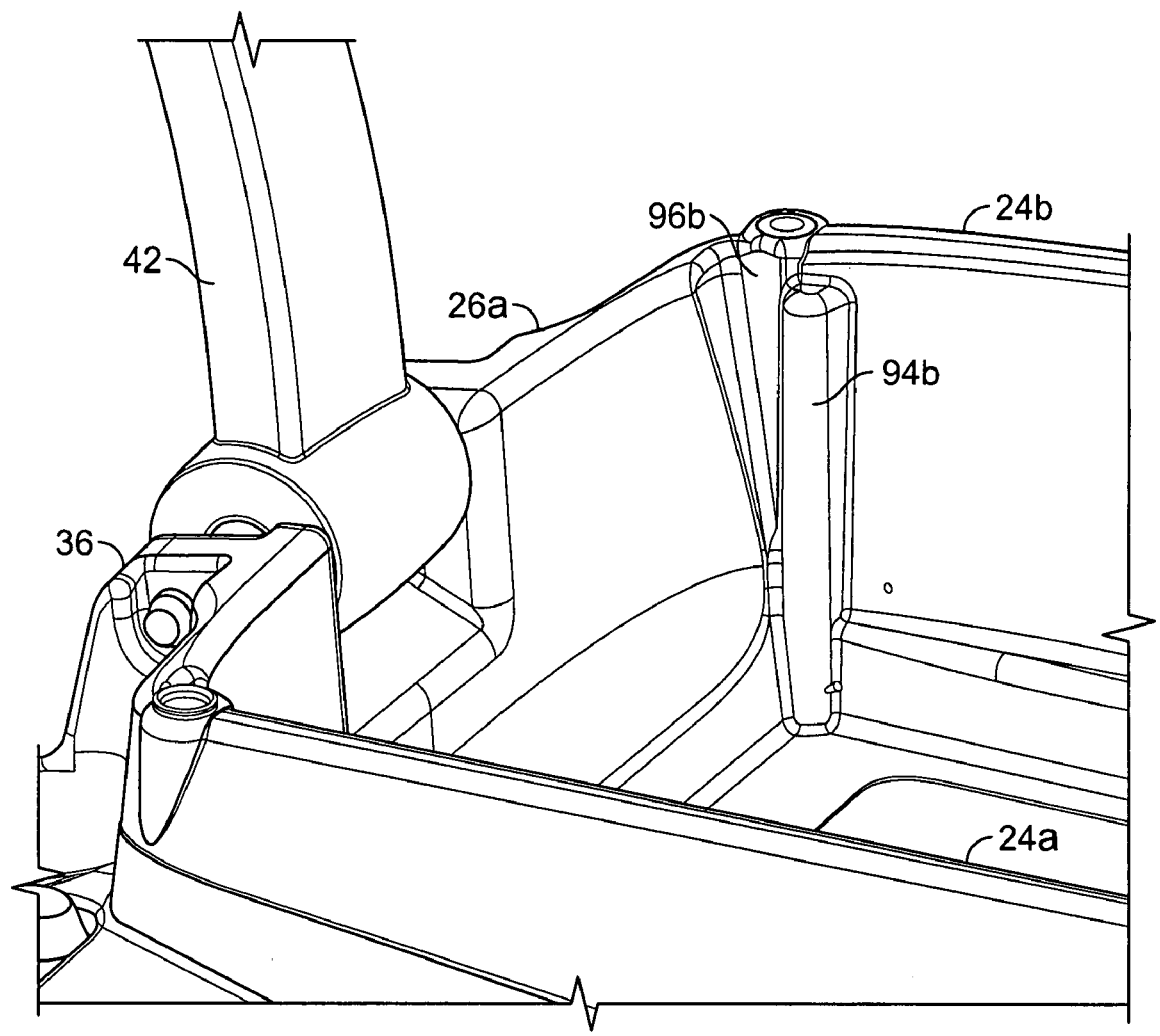
FIG. 5 is an enlarged perspective view showing one of the front corners of the interior of the wagon of FIG. 1 with the front panel removed.
Figure 6A:
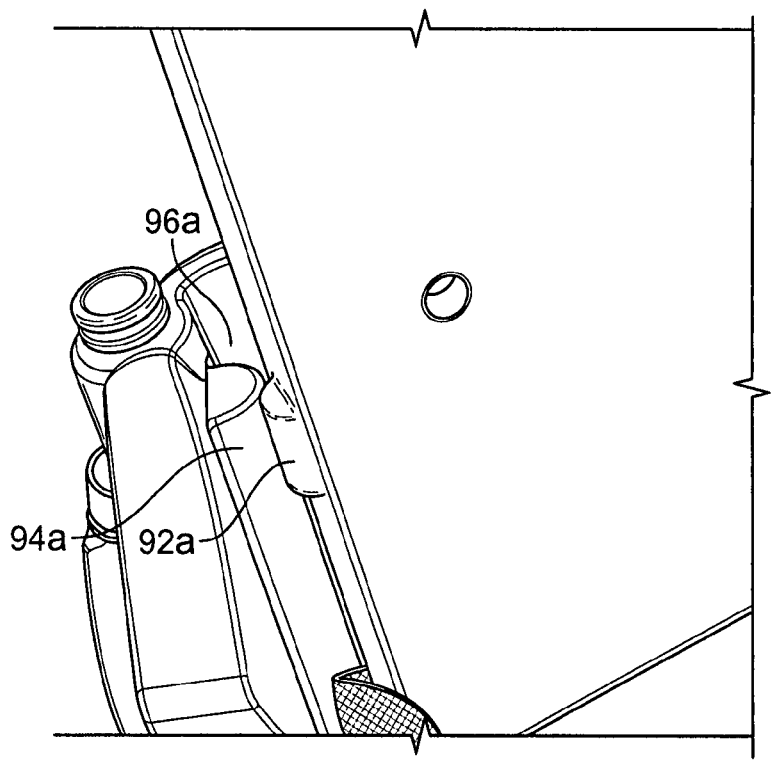
FIGS. 6A and 6B are enlarged perspective views showing the engagement of the front panel with a front corner of the interior of the wagon of FIG. 1.
Figure 6B:
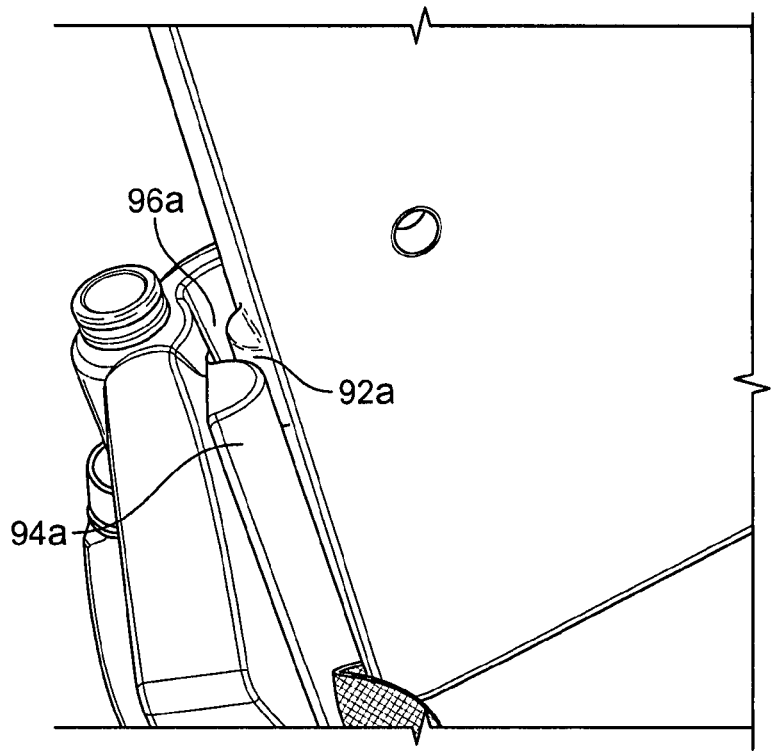

As illustrated in FIG. 5 (see also FIG. 17), a vertical elongated projection 94b is formed on side wall 24b and cooperates with front wall 26a to form V-shaped slot 96b. As illustrated in FIGS. 6A and 6B, vertical elongated projection 94a is formed on side wall 24a so that an opposing V-shaped slot 96a is also formed between side wall 24a and front wall 26a.

As illustrated in FIGS. 6a and 6b, the bosses 92a and 92b of the front panel 82 pass over vertical projections 94a and 94b and snap into V-shape slots 96a and 96b, respectively, to hold the front seatback in the upright position illustrated in FIGS. 1 and 2. When in this position, the front panel 82 serves as a seatback for a child sitting on seat bottom 44 with the middle compartment 46 serving as a foot well.

As illustrated in FIGS. 1 and 2, a lower rear panel 98 and an upper rear panel 102 form a seat for a second child that faces the seat formed by seatback 82 and seat bottom 44. The second child also uses the middle compartment 46 as a foot well. As illustrated in FIG. 2, the bottom of lower rear panel 98 is supported by ledge 64 and the corresponding ledge formed on the interior surface of side wall 24a.

Figure 7:
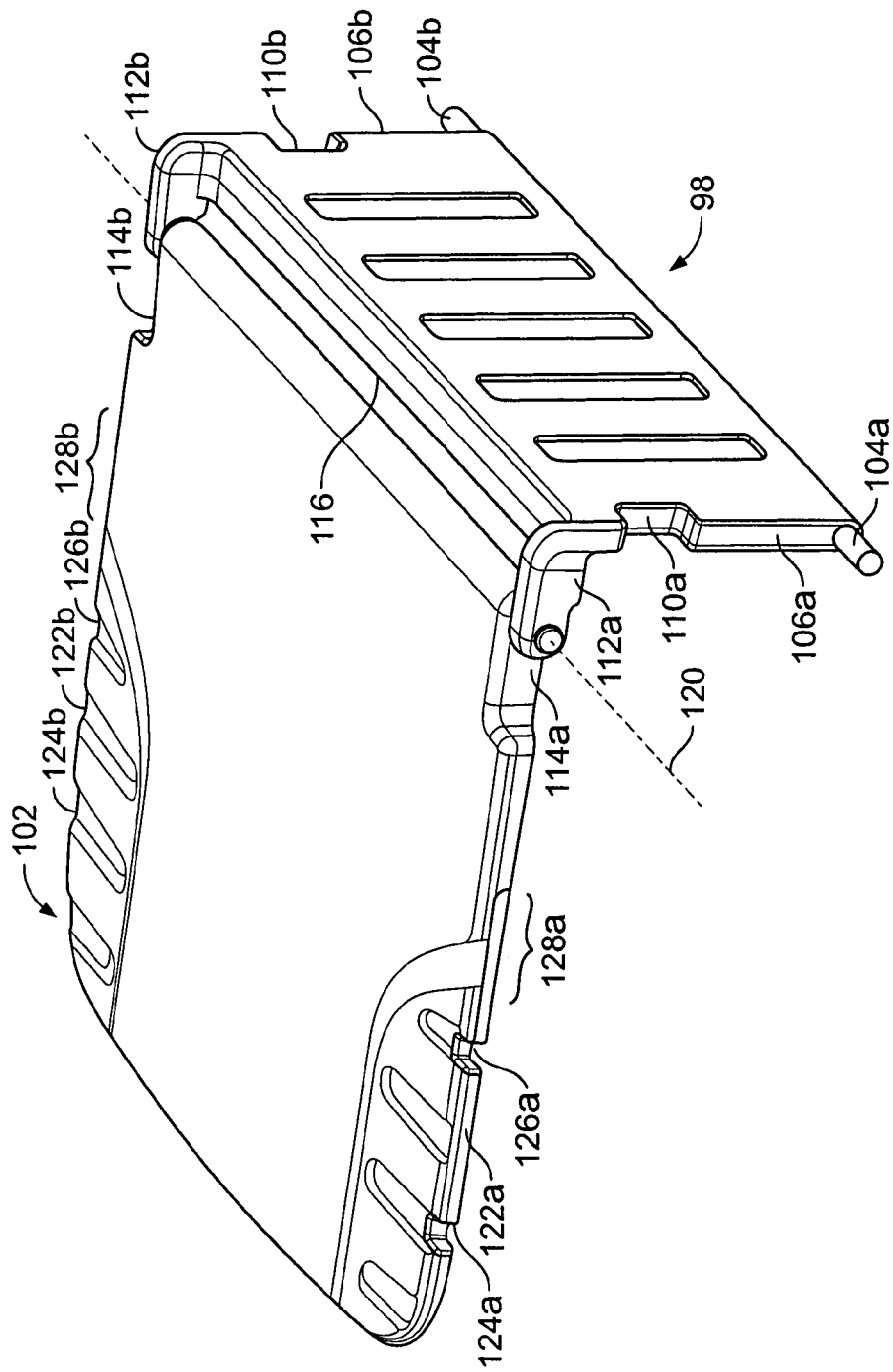
FIG. 7 is an enlarged perspective view showing the two rear panels of the wagon of FIG. 1.

As illustrated in FIG. 7, lower rear panel, indicated in general at 98, features a pair of pins 104a and 104b formed on side edges 106a and 106b, respectively. These pins engage bores formed in side walls 24a and 24b of FIGS. 1 and 2 so that the lower rear panel 98 may pivot about axis 108 of FIG. 2. As illustrated in FIG. 7, a pair of notches 110a and 110b are formed in opposite side edges of the lower rear panel 98. In addition, a pair of L-shaped brackets 112a and 112b are also formed on side edges 106a and 106b on the ends opposite pins 104a and 104b.

Upper rear panel 102 features a pair of cutouts 114a and 114b that are sized so that the bottom end 116 of panel 102 fits between brackets 112a and 112b. Pins (not shown) extend between the brackets 112a and 112b the bottom end 116 of panel 102 so that the upper rear panel 102 pivots with respect to the lower rear panel 98 about axis 120. The side edges 122a and 122b of the upper rear panel 102 feature notches 124a, 124b, 126a and 126b, the use of which will be explained below, as well as pill-shaped bosses 128a and 128b.

Figure 8:
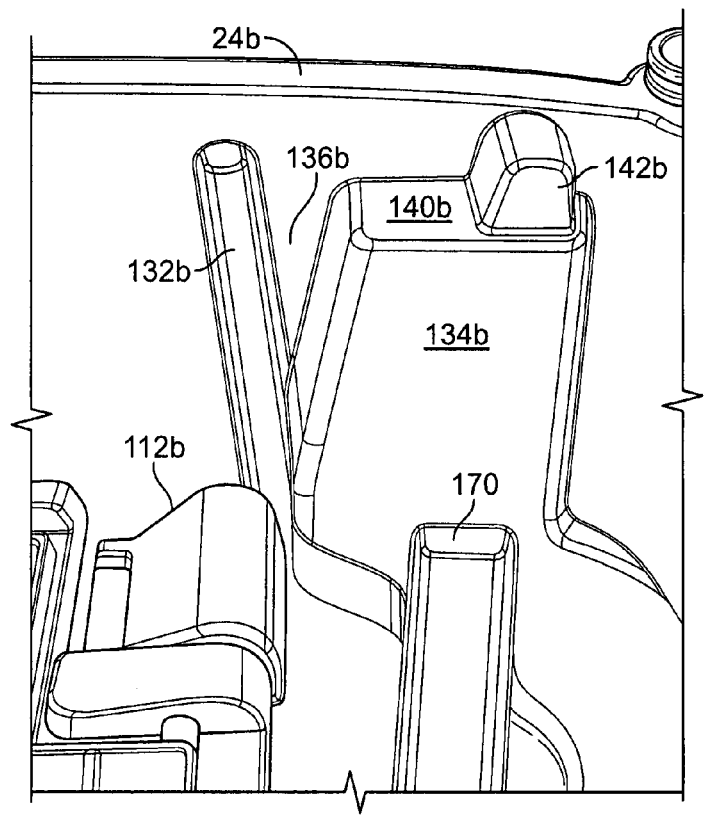
FIG. 8 is an enlarged perspective view showing one of the rear corners of the interior of the wagon of FIG. 1.
Figure 9:
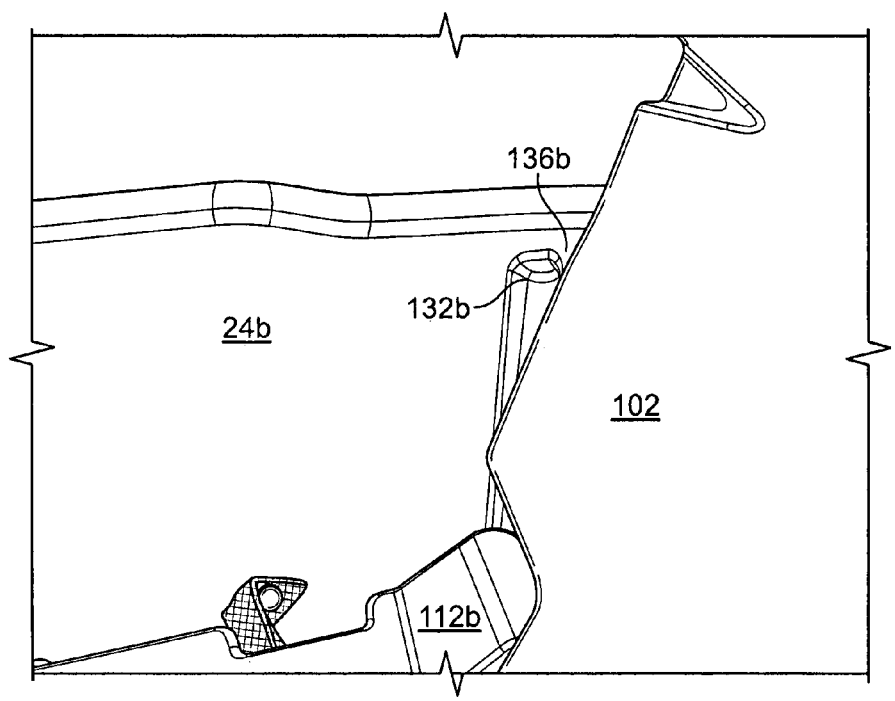
FIG. 9 is an enlarged perspective view showing the engagement of one of the rear panels with a rear corner of the interior of the wagon of FIG. 1.

As illustrated in FIG. 8, side wall 24b features vertical elongated projection 132b which cooperates with block-shaped projection 134b to form V-shaped slot 136b. The top end of block-shaped projection 134b features a horizontal flat portion 140b and a step portion 142b. Side wall 24a features a mirror image of this arrangement. Boss 128b (FIG. 7) of the upper rear panel 102 engages V-shaped slot 136b, as illustrated in FIG. 9, while boss 128a (FIG. 7) engages the corresponding V-shaped slot of side wall 24a. As a result, the seatback 102 is locked in the upright position illustrated in FIGS. 1 and 2.

In addition to providing seating for two children, the configuration of FIG. 1 also provides easy-access storage behind panel 102 via rear compartment 48, as illustrated in FIGS. 1 and 2.

Figure 10:
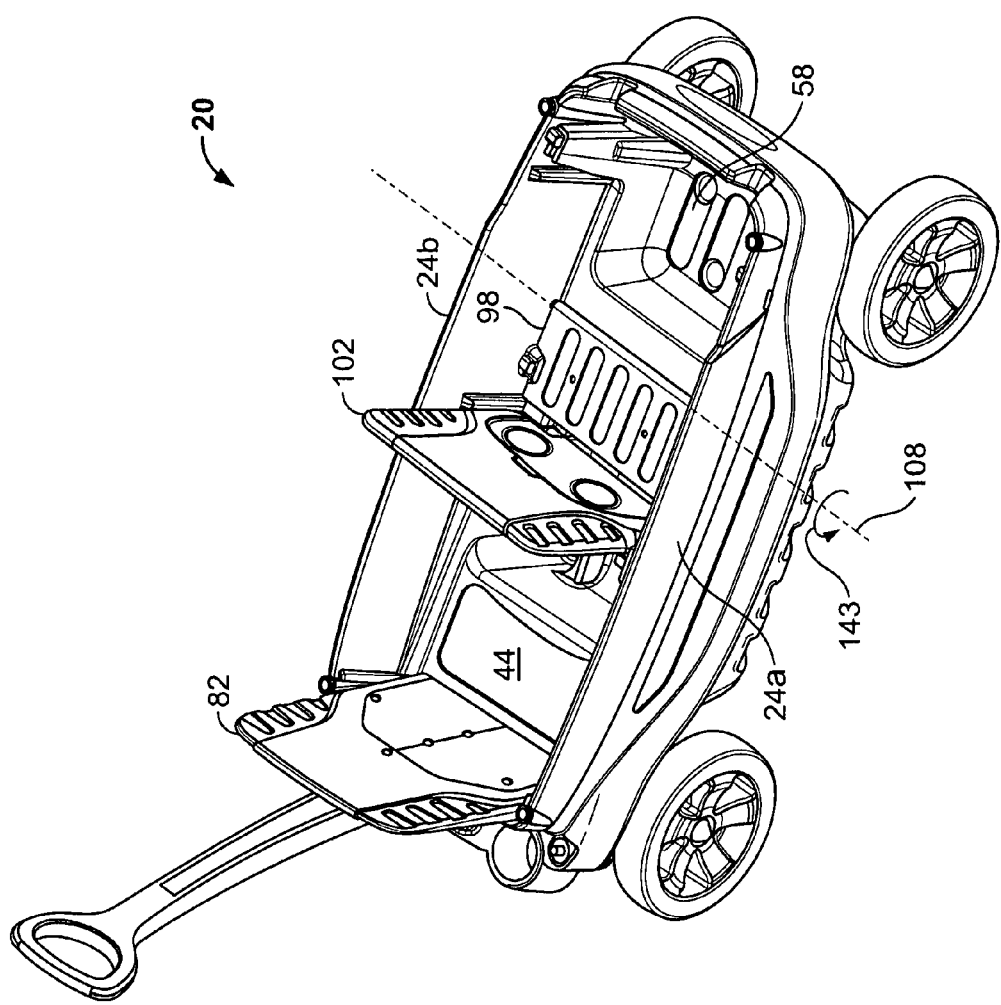
FIG. 10 is a perspective view of the wagon of FIG. 1 in a second configuration.

A second configuration of the wagon 20 is illustrated in FIG. 10. In this configuration, the front panel 82 remains in the upright position to serve as a seatback for a child sitting on seat bottom 44. Lower rear panel 98, however, has been rotated counter-clockwise 180 degrees, as indicated by arrow 143, to the positions illustrated in FIGS. 10 and 11. As panel 98 was rotated into the position illustrated in FIG. 9, panel 102 rotated 180 degrees about axis 120 (FIG. 7) clockwise with respect to panel 98.

Figure 11:
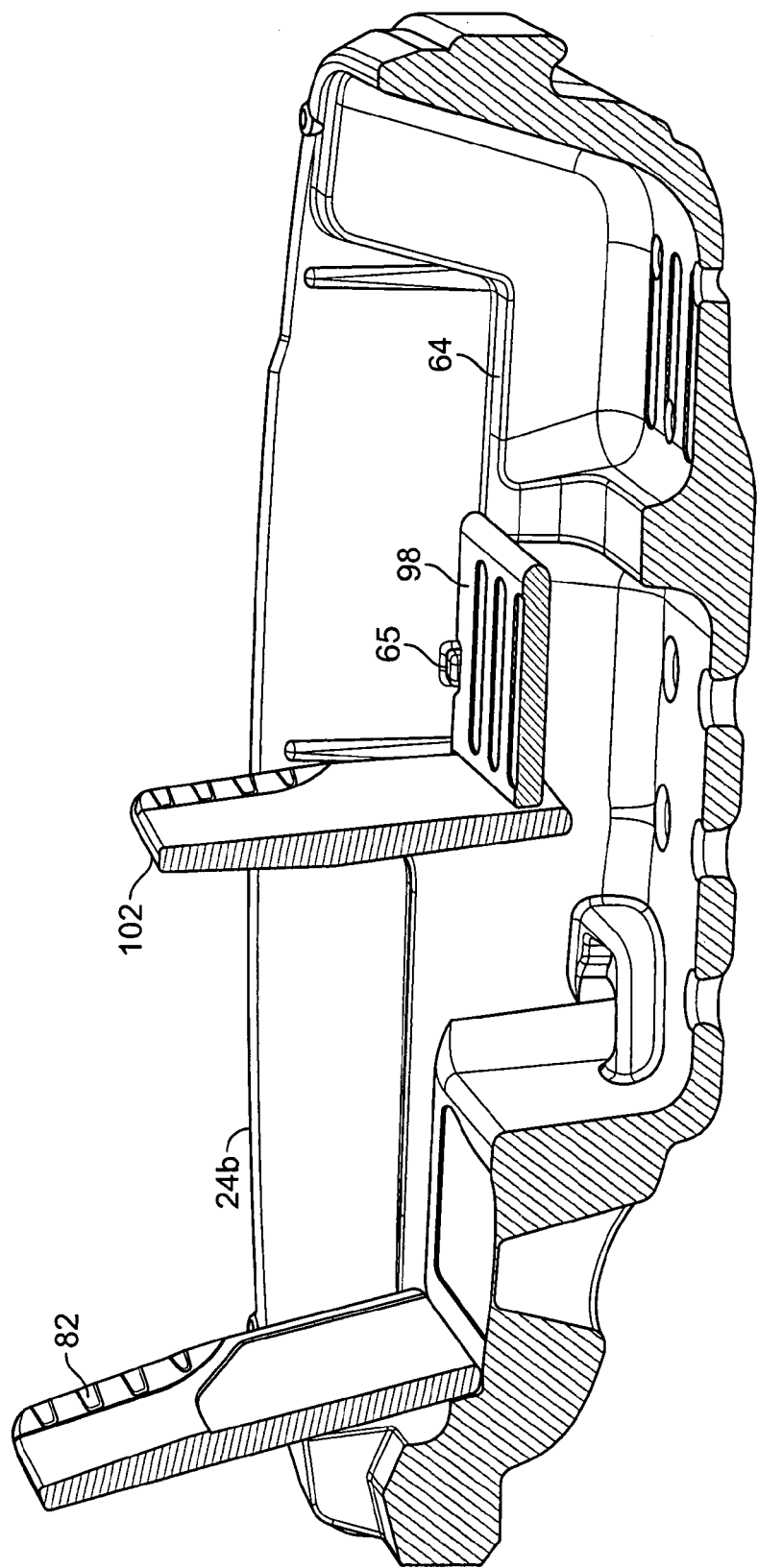
FIG. 11 is a sectional view of the body and interior panels of the wagon of FIG. 10.
Figure 12:
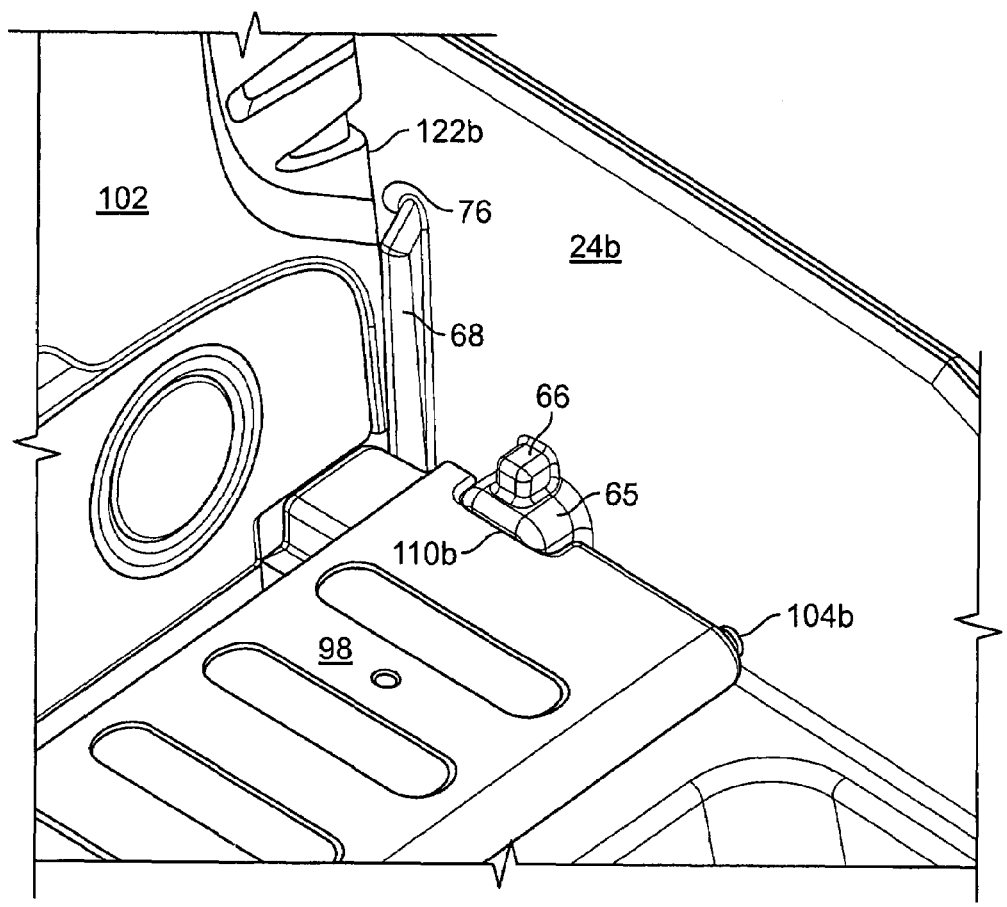
FIG. 12 is an enlarged perspective view of the two rear panels engaging a side wall of the wagon of FIG. 11.

As illustrated in FIG. 11, lower rear panel 98 is supported by ledge 64 while, as illustrated in FIG. 12, the notch 110b of lower rear panel 98 is engaged by horizontal flat portion 65 of side wall 24b. Notch 110a (FIG. 7) of lower rear panel 98 is engages by a projection formed in side 24a (FIG. 10) that corresponds to horizontal flat portion 65 of FIG. 12. In addition, as illustrated in FIG. 12, side edge 122b of upper rear panel 102 is received within slot 76 formed by inverted-spike shaped projection 68 and tower-shaped projection 72 (FIG. 3). Side edge 122a (FIG. 7) of upper rear panel 102 is received by a slot formed in side wall 24a (FIG. 10) that corresponds to slot 76. As a result, panels 98 and 102 are secured in positions shown in FIGS. 10 and 11.

The configuration of wagon 20 illustrated in FIGS. 10 and 11 provides a larger storage compartment, having a bottom defined by panel 98 and rear compartment floor 58. The larger storage compartment is separated from a child seated on seat bottom 44, and using panel 82 as a seatback, by upright panel 102. Alternatively, a child may use panel 98 as a seat and upright panel 102 as a seatback with rear compartment 48 (FIG. 2) as a foot well.

Figure 13:
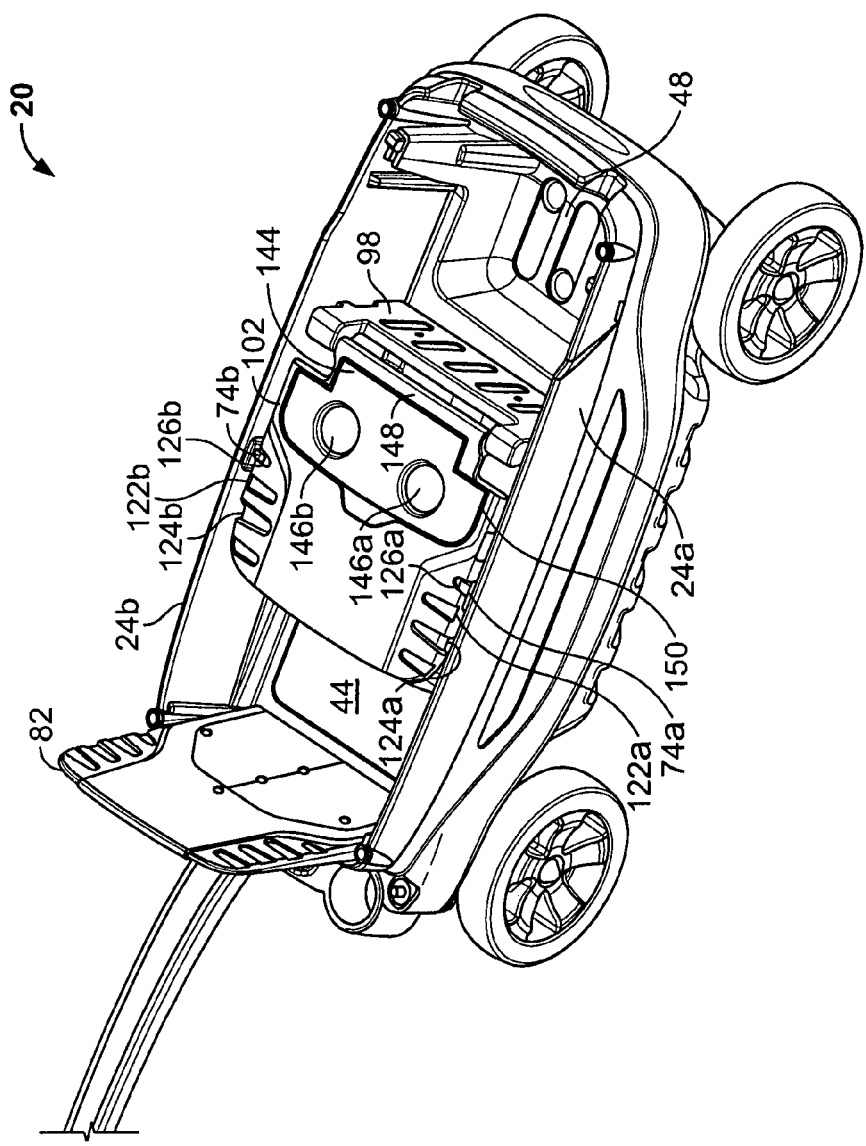
FIG. 13 is a perspective view of the wagon of FIG. 1 in a third configuration.
Figure 14:
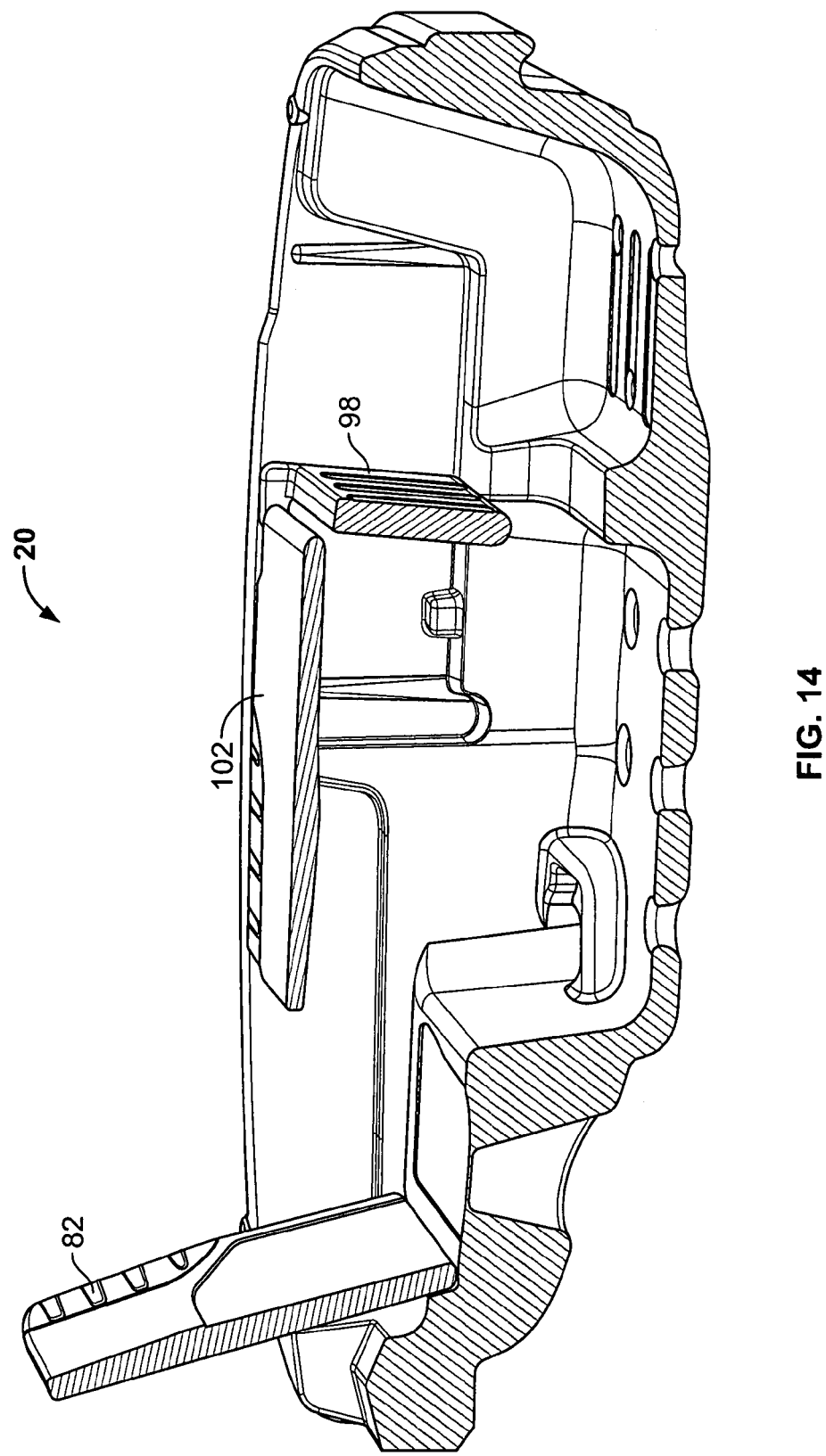
FIG. 14 is a sectional view of the body and interior panels of the wagon of FIG. 13.

A third configuration of wagon 20 is illustrated in FIGS. 13 and 14. In the configuration of FIGS. 13 and 14, panel 98 has been rotated 90 degrees clockwise about axis 108 (FIG. 10) from the position illustrated in FIG. 10 to a generally vertical position while panel 102 has been rotated 180 degrees counter-clockwise about axis 120 (FIG. 7) from the position illustrated in FIG. 10 with respect to panel 98. As illustrated in FIG. 13, notches 126a and 126b of panel 102 are engaged by step projections 74a and 74b of side walls 24a and 24b, respectively, and panel 102 side edges 122a and 122b are supported by horizontal flat portions 73a (not shown) and 73b (FIG. 3), respectively, to secure the panels 102 and 98 in the illustrated positions. Front panel 82 remains in the same upright position as illustrated for the two previous configurations.

An optional cup holder tray, indicated at 144 in FIG. 13, features circular molded recesses 146a and 146b and is attached at its bottom end via a hinge 148 to panel 102. A recess 150 is molded into panel 102 and is sized to receive tray 144 in an interference fit fashion. As a result, the cup holder tray 144 is secured to the panel in the position shown in FIG. 13, but may be unfolded for purposes described below.

The configuration illustrated in FIGS. 12 and 13 provides a child seated in the seat formed by seat bottom 44 and panel 82 (acting as a seatback) with an activity desk or table, formed by panel 102. A child may use the activity table for a variety of activities such as coloring or eating. With regard to the latter, the child may place his or her beverage in the cup holders provided by cup holder tray 144. If a child seated in the wagon requires additional room in front of the activity table, notches 124a and 124b of panel 102 may be placed in engagement with step projections 74a and 74b, respectively, in place of notches 126a and 126b. Furthermore, the configuration provides a storage space, defined by rear compartment 48, which is separated from the child by generally vertical panel 98.

Figure 15:
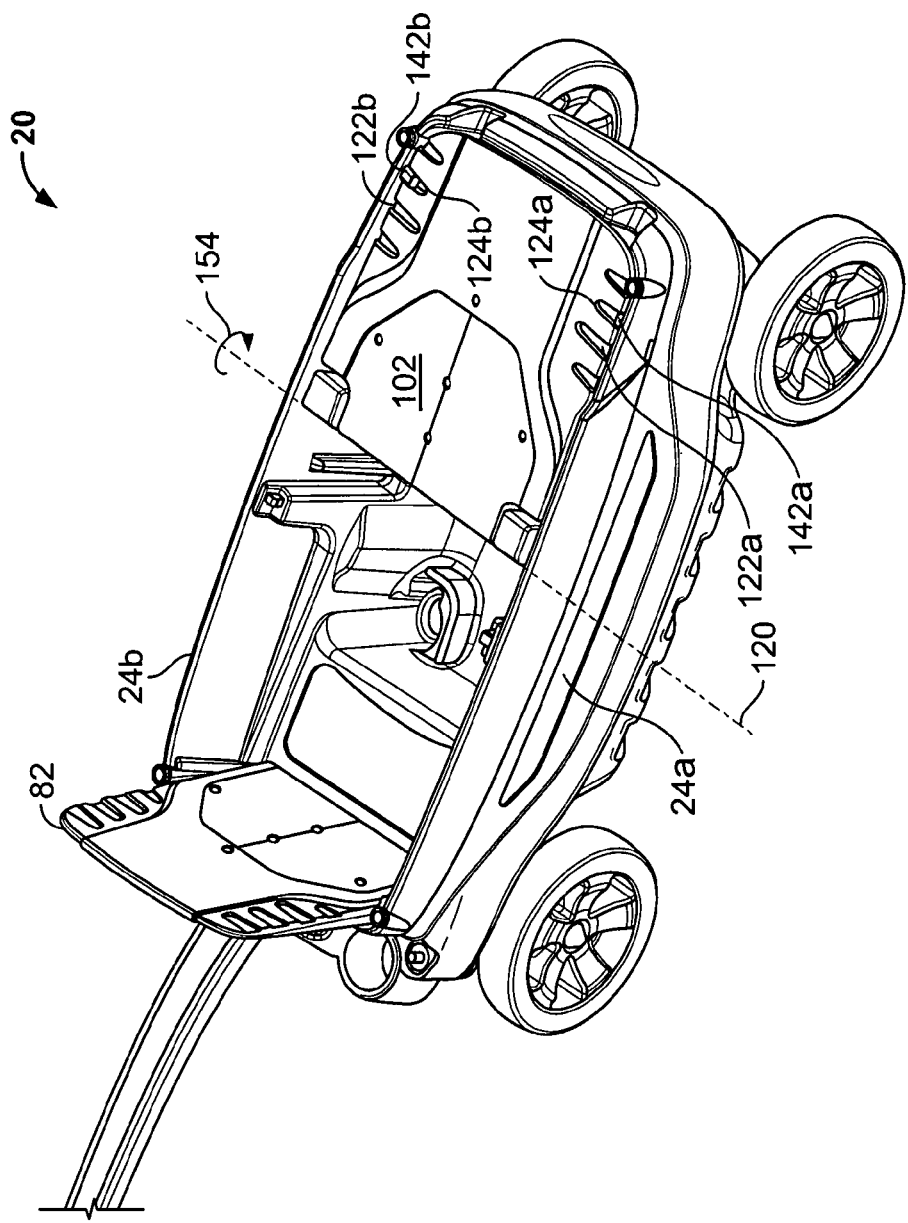
FIG. 15 is a perspective view of the wagon of FIG. 1 in a fourth configuration.
Figure 16:
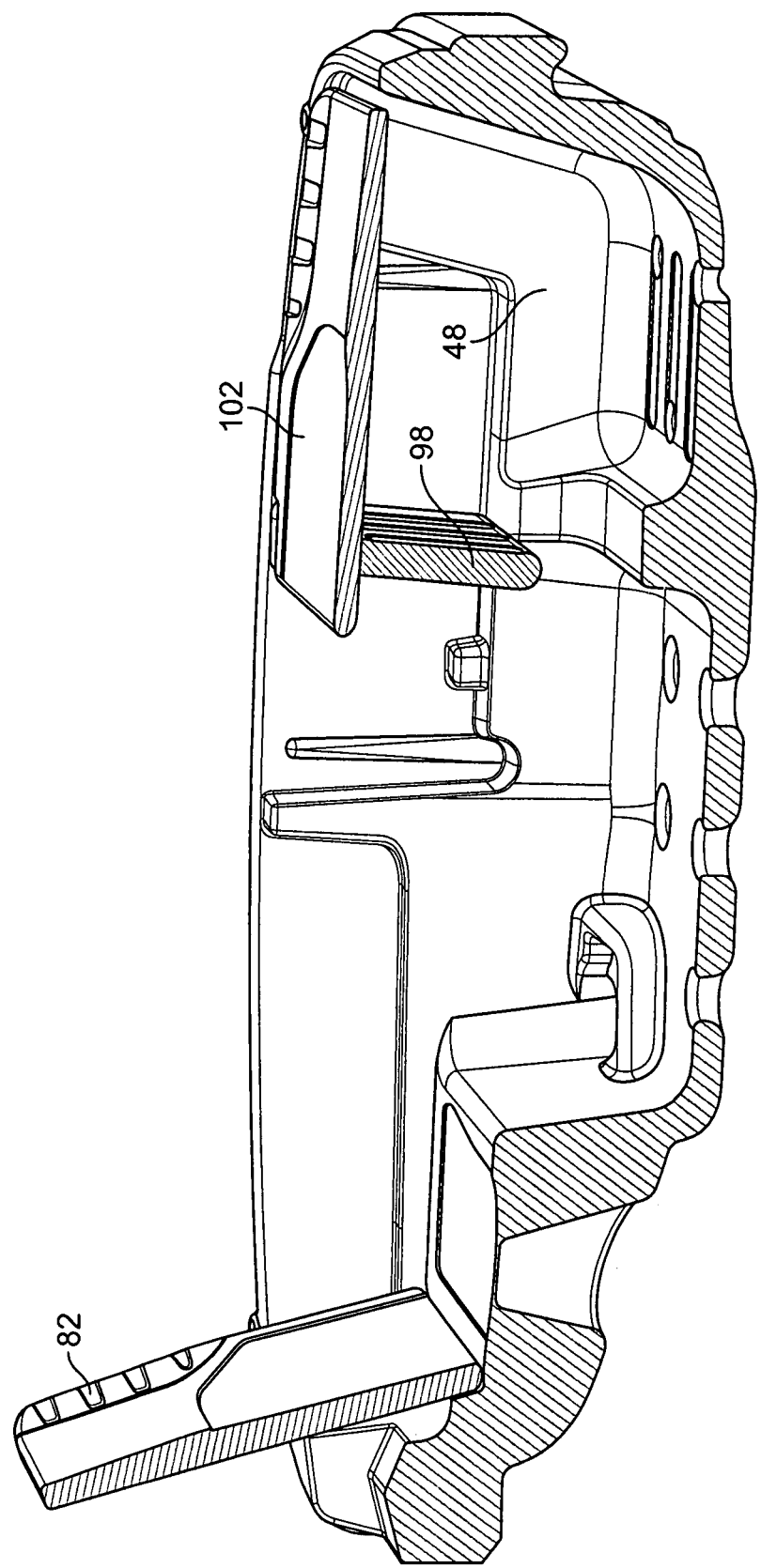
FIG. 16 is a sectional view of the body and interior panels of the wagon of FIG. 15.

A fourth configuration of the wagon 20 is illustrated in FIGS. 15 and 16. In this configuration, panel 102 has been rotated 180 degrees about axis 120, as indicated by arrow 154 (FIG. 15) from the position illustrated in FIGS. 13 and 14. As a result, panel 102 serves as a lid and rear compartment 48 (FIG. 16) becomes covered storage. With reference to FIG. 15, notches 124a and 124b of panel 102 are engaged by step projections 142a and 142b, respectively, while the side edge 122b of panel 102 rests on the horizontal flat portion 140b (FIG. 8). Side edge 122a of panel 102 rests on an opposing horizontal flat portion formed on side wall 24a. As a result, panels 102 and 98 (FIG. 16) are secured in the positions shown. Front panel 82 remains in the same upright position as illustrated for the two previous configurations.

Figure 18:
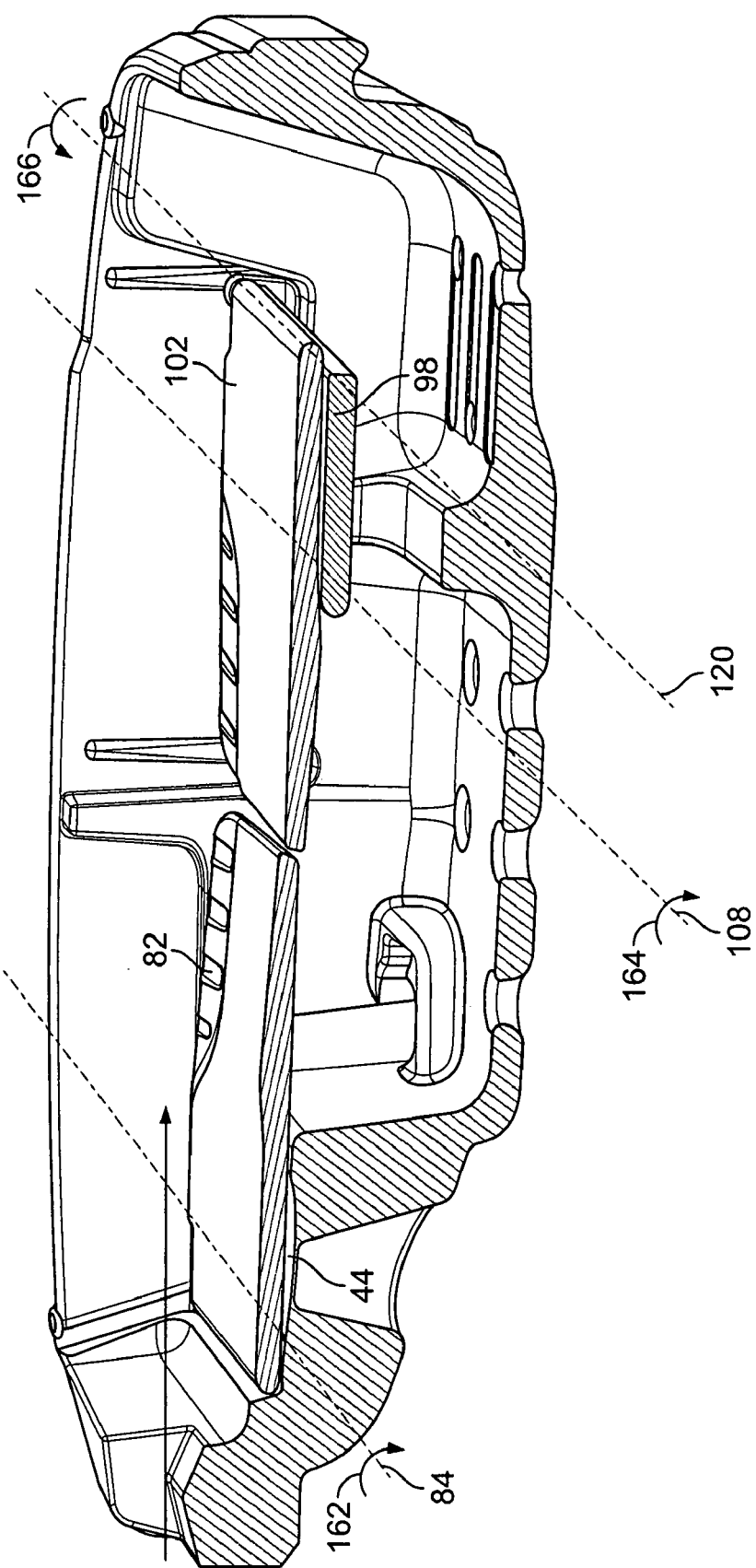
FIG. 18 is a sectional view of the body and interior panels of the wagon of FIG. 17.

A fifth embodiment of the wagon 20 is illustrated in FIGS. 17 and 18. This configuration provides a generally flat floor for the interior of the wagon so that a child may lay down, 3 children may be accommodated or maximum cargo hauling capacity may be obtained.

With reference to FIG. 18, the configuration of FIGS. 17 and 18 is obtained by rotating the front panel 82 from the upright position shown in FIG. 16 approximately 90 degrees clockwise about axis 84, as indicated by arrow 162, to a generally horizontal position so that it rests on seat bottom 44. Lower rear panel 98 is rotated from the position shown in FIG. 16 approximately 90 degrees clockwise about axis 108, as indicated by arrow 164, to generally horizontal position where it rests on ledge 64 (FIG. 3). Upper rear panel 102 is rotated approximately 270 degrees counter-clockwise from the position shown in FIG. 16 about axis 120, as indicated by arrow 166 and with respect to panel 98, to a generally horizontal position where it rests on panel 98.

As illustrated in FIG. 17, the notch 124b of panel 102 is engaged by step projection 66, while the side edge 122b of the panel 102 is supported by the horizontal flat portion 65 (FIG. 3) of wall 24b. Notch 124a and side edge 122a of panel 102 (both illustrated in FIG. 7) are similarly engaged by a projection and horizontal flat surface formed on wall 24a that correspond to and oppose step projection 66 and horizontal flat portion 65. As illustrated in FIG. 17, cup holder tray 144 is pivoted approximately 180 degrees clockwise away from panel 102 and rests on ledge 170 (FIG. 8) formed on side wall 24b, and a corresponding ledge formed on side wall 24a, to cover the gap illustrated in FIG. 18 between horizontally-positioned panel 102 and the rear wall of the wagon.

The wagon of the present invention therefore provides multiple useful configurations. This greatly increases the versatility, convenience and utility of the wagon over wagons of the prior art. In addition, the wagon offers pivoting panels that are used to easily reconfigure the wagon. These panels are attached to the wagon so that they cannot be easily lost.

While embodiments of the invention have been shown and described, it will be apparent to those skilled in the art that changes and modifications may be made therein without departing from the spirit of the invention.

What is claimed is:

1. A children's wagon comprising:
   a) a body supported by a plurality of wheels, said body including a front wall, a rear wall, opposing side walls and a bottom so that an interior is defined;
   b) a first panel pivotally attached to the wagon body and positioned within the interior of the wagon body; and
   c) a second panel pivotally attached to the first panel so that said first and second panels may be placed in a variety of positions to provide the wagon with multiple interior configurations.

2. The wagon of claim 1 wherein the first panel is pivotally attached to the side walls of the wagon.

3. The wagon of claim 2 wherein the first panel features a pair of side edges and each of said wagon body side walls includes a bore and further comprising a pair of pins positioned one each on the side edges of said first panel, each of said pins independently engaging one of the bores.

4. The wagon of claim 2 wherein each side wall features a ledge and said first panel may be pivoted between a generally upright position and a generally horizontal position where the first panel is supported by the ledges.

5. The wagon of claim 1 wherein the second panel features opposing side edges and each of said side edges is provided with a boss and wherein each side wall of the wagon includes a slot that is engages by the bosses of the second panel when the second panel is in an upright position.

6. The wagon of claim 1 further comprising a pair of step projections positioned one each on said side walls and wherein the second panel features opposing side edges, each having a notch formed therein, where each of said notches is independently engaged by one of said step projections when the second panel is in a generally horizontal position.

7. The wagon of claim 1 further comprising a third panel pivotally attached to the wagon body and positioned within the wagon body.

8. The wagon of claim 7 wherein said third panel features a pair of side edges and each of said wagon body side walls includes a bore and further comprising a pair of pins positioned one each on the side edges of said first panel, each of said pins independently engaging one of the bores.

9. The wagon of claim 7 wherein the bottom of the wagon body includes a seat bottom and said third panel may be pivoted between an upright position where the seat bottom is exposed and a generally horizontal position where the seat bottom is covered.

10. The wagon of claim 9 wherein the bottom of the wagon body also serves as a bottom of a storage space that is positioned adjacent to the seat bottom and that serves as a foot well when the third panel is pivoted to the upright position.

11. The wagon of claim 10 wherein the storage space is a middle storage space and wherein the bottom of the wagon also serves as a bottom of a rear storage space that is positioned adjacent to the middle storage space and wherein the first panel is pivotally mounted between the middle and rear storage spaces.

12. The wagon of claim 7 wherein the third panel features opposing side edges and each of said side edges is provided with a boss and wherein each side wall of the wagon includes a slot that is engages by the bosses of the third panel when the third panel is in an upright position.

13. The wagon of claim 1 further comprising a cup holder tray pivotally attached to the second panel.

14. The wagon of claim 1 further comprising a handle attached to the wagon body.

15. The wagon of claim 1 wherein said body and said first and second panels are all constructed of plastic.

16. A children's wagon comprising:
   a) a body supported by a plurality of wheels and featuring an interior;
   b) a first panel attached to the body in a pivoting fashion and positioned within the interior of the body; and
   c) a second panel attached to the first panel in a pivoting fashion so that said first and second panels may be placed in a variety of positions to provide the wagon with multiple interior configurations.

17. The wagon of claim 16 wherein the first panel features a pair of side edges and said wagon body includes a pair of bores and further comprising a pair of pins positioned one each on the side edges of said first panel, each of said pins independently engaging one of the bores.

18. The wagon of claim 16 further comprising a third panel pivotally attached to the wagon body and positioned within the wagon body.

19. A wagon comprising:
   a) a body supported by a plurality of wheels;
   b) a first panel attached to the body in a pivoting fashion; and
   c) a second panel attached to the first panel in a pivoting fashion so that said first and second panels may be placed in a variety of positions to provide the wagon with multiple configurations.

20. The wagon of claim 19 wherein the first panel features a pair of side edges and said wagon body includes a pair of bores and further comprising a pair of pins positioned one each on the side edges of said first panel, each of said pins independently engaging one of the bores.

* * * * *